United States Patent
Li et al.

(10) Patent No.: US 8,405,801 B2
(45) Date of Patent: Mar. 26, 2013

(54) REFLECTIVE LIQUID CRYSTAL PANEL

(75) Inventors: Yuet Wing Li, Tainan County (TW); Kuan-Hsu Fan-Chiang, Tainan County (TW)

(73) Assignee: Himax Display, Inc., Tainan (TW)

( * ) Notice: Subject to any disclaimer, the term of this patent is extended or adjusted under 35 U.S.C. 154(b) by 320 days.

(21) Appl. No.: 12/828,510

(22) Filed: Jul. 1, 2010

(65) Prior Publication Data

US 2011/0128474 A1 Jun. 2, 2011

Related U.S. Application Data

(60) Provisional application No. 61/265,755, filed on Dec. 2, 2009.

(51) Int. Cl.
*G02F 1/1335* (2006.01)
(52) U.S. Cl. ......................................................... 349/96
(58) Field of Classification Search .................. None
See application file for complete search history.

(56) References Cited

U.S. PATENT DOCUMENTS

| | | | | |
|---|---|---|---|---|
| 5,490,003 | A | 2/1996 | Van Sprang | 349/96 |
| 6,900,865 | B2 * | 5/2005 | Tillin | 349/117 |
| 7,110,055 | B2 * | 9/2006 | Wang | 349/33 |
| 2003/0058385 | A1 * | 3/2003 | McKnight et al. | 349/96 |
| 2005/0237446 | A1 * | 10/2005 | Zhu et al. | 349/99 |
| 2010/0265443 | A1 * | 10/2010 | Peng et al. | 349/130 |

* cited by examiner

*Primary Examiner* — Sung Pak
(74) *Attorney, Agent, or Firm* — J.C. Patents

(57) ABSTRACT

A reflective liquid crystal panel including a first substrate, a first alignment layer, a second substrate, a second alignment layer, a liquid crystal layer and a reflection layer is provided. The first alignment layer disposed on the first substrate has a first alignment direction. The second substrate is opposite to first substrate. The second alignment disposed on the second substrate has a second alignment direction, wherein an included angle between the first alignment direction and the second alignment direction is substantially between 68 degrees and 85 degrees. The liquid crystal layer is disposed between the first substrate and the second substrate. The first alignment layer and the second alignment layer align the liquid crystal so that the liquid crystal layer has a twisted angle, wherein the twisted angle and the included angle are substantially the same. The reflection layer is disposed between the second alignment layer and the second substrate.

9 Claims, 6 Drawing Sheets

REFLECTIVE LIQUID CRYSTAL PANEL

CROSS-REFERENCE TO RELATED APPLICATION

This application claims the priority benefit of U.S. provisional application Ser. No. 61/265,755, filed on Dec. 2, 2009. The entirety of the above-mentioned patent application is hereby incorporated by reference herein and made a part of specification.

BACKGROUND OF THE INVENTION

1. Field of the Invention

The invention relates generally to a liquid crystal panel, and more particularly to a reflective liquid crystal panel.

2. Description of Related Art

Recently, developments of pico projection techniques have caught the attention of many watchers, as these devices (or mini projectors) have gradually become the mainstream for the future personal digital market. As all types of electronic products are being developed towards high speed, high efficiency, light weight and compact size, pico projectors have advantages of high portability and not being limited by sites of operation. Thus in the future, pico projectors may be embedded in products such as mobile phones or digital cameras.

Generally speaking, reflective display devices are required to provide a high reflectance and contrast, as well as a fast response speed. Currently, reflective display devices include, for example, liquid crystal on silicon (LCOS) display devices or reflective display devices employing microelectromechanical systems.

When implemented in the structure of a conventional liquid crystal display (LCD), the LCOS technique can realize a substantially higher contrast and brightness. However, when the LCOS device employs nematic liquid crystal molecules, usually four issues are inherent in the device: 1) low static contrast, 2) low reflectance, 3) need of compensation films to enhance contrast, and 4) slow response speed. Typically, these four issues are correlated with each other. For example, when using compensation films to enhance contrast, reflectance is reduced. Moreover, when maintaining high contrast, a phase retardation of the liquid crystal layer needs to be increased correspondingly, and doing so increases cell gaps, thereby slowing down the response speed. Hence, imminent issues for the reflective display device include solving the aforementioned problems while achieving high image contrast and reflectance, as well as fast response time.

SUMMARY OF THE INVENTION

An aspect of the invention provides a reflective liquid crystal panel having a substantially higher image contrast and reflectance, as well as a faster response time.

Other objects and advantages of the invention can be further illustrated by the technical features broadly embodied and described as follows.

In order to achieve one or a part of or all of the above advantages or other advantages, an embodiment of the invention provides a reflective liquid crystal panel, including a first substrate, a first alignment layer, a second substrate, a second alignment layer, a liquid crystal layer, and a reflection layer. The first alignment layer is disposed on the first substrate and has a first alignment direction. The second substrate is opposite to the first substrate. The second alignment layer is disposed on the second substrate and has a second alignment direction, and an included angle between the first alignment direction and the second alignment direction is substantially between 68 degrees and 85 degrees. The liquid crystal layer is disposed between the first substrate and the second substrate. The first alignment layer and the second alignment layer align the liquid crystal layer so that the liquid crystal layer has a twisted angle, in which the twisted angle and the included angle are substantially the same. The reflection layer is disposed between the second alignment layer and the second substrate. According to an embodiment of the invention, the twisted angle is substantially 77 degrees.

According to an embodiment of the invention, the reflective liquid crystal panel further includes a beam splitter device disposed on a side of the first substrate away from the first alignment layer. The beam splitter device is adapted to transmit a light to a first substrate, and after entering the liquid crystal layer by passing through the first alignment layer, the light is reflected by the reflection layer and emitted from the first substrate after passing through the second alignment layer, the liquid crystal layer, and the first alignment layer in sequence. According to an embodiment of the invention, the light has a first polarization direction when transmitted to the first substrate, and an angle is formed between the first polarization direction and the first alignment direction, the angle being substantially between 2 degrees and 7 degrees. According to an embodiment of the invention, the angle is substantially 5 degrees. According to an embodiment of the invention, the light has a second polarization direction after being emitted from the first substrate, and the light is transmitted to the beam splitter device and thereby transmitted to an image side. Moreover, the second polarization direction and the first polarization direction are different. According to an embodiment of the invention, the beam splitter devices includes a polarization beam splitter device.

According to an embodiment of the invention, a distance between the first alignment layer and the second alignment layer is configured for the liquid crystal layer to have a phase retardation, and the phase retardation of the liquid crystal layer is substantially between $1.25 \times 10^{-7}$ m and $3.25 \times 10^{-7}$ m. According to an embodiment of the invention, the phase retardation is substantially $2.05 \times 10^{-7}$ m.

According to an embodiment of the invention, a light is adapted to enter into the reflective liquid crystal panel through the first substrate, and after the light passes through the first alignment layer, the liquid crystal layer, and the second alignment layer in sequence, the light is reflected by the reflection layer so that the light is emitted from the first substrate after passing through the second alignment layer, the liquid crystal layer, and the first alignment layer in sequence again. According to an embodiment of the invention, the light has a first polarization direction when entering the reflective liquid crystal panel, and an angle is formed between the first polarization direction and the first alignment direction, the angle being substantially between 2 degrees and 7 degrees. According to an embodiment of the invention, the light has a second polarization direction after being emitted from the first substrate, and the second polarization direction and the first polarization direction are different. According to an embodiment of the invention, the first polarization direction is substantially perpendicular to the second polarization direction.

In summary, the invention discussed in the embodiments thereof has at least one of the following advantages. Since the twisted angle of the liquid crystal layer is substantially between 68 degrees and 85 degrees, therefore the image contrast, reflectance, and response time of the reflective liquid crystal panel are enhanced. Moreover, the reflective liquid crystal panel may be configured to employ a beam splitter device such that light passing through the first alignment layer has the first polarization direction, and an angle α is formed between the first polarization direction and the first alignment direction, in which the range of the angle α is substantially between a predetermined range. Accordingly, the image contrast, reflectance, and response time of the reflective liquid crystal panel may be further enhanced.

Furthermore, by suitably designing the thickness of the liquid crystal layer and the refractive indices of the liquid crystal molecules, such that the phase retardation of the liquid crystal layer is within a predetermined range, and in conjunction with the aforementioned parameter settings (e.g., the values of the angle α and the twisted angle φ), besides being capable of enhancing the image contrast, reflectance, and response time of the reflective liquid crystal panel, the overall polarization conversion efficiency thereof is increased by at least 7.9%, thereby obtaining a preferred optical performance and electrical characteristic.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that both the foregoing and other detailed descriptions, features and advantages are intended to be described more comprehensively by providing an embodiment accompanied with figures hereinafter. The language used to describe the directions such as up, down, left, right, front, back or the like in the reference drawings is regarded in an illustrative rather than in a restrictive sense. Thus, the language used to describe the directions is not intended to limit the scope of the invention.

Figure 1A:
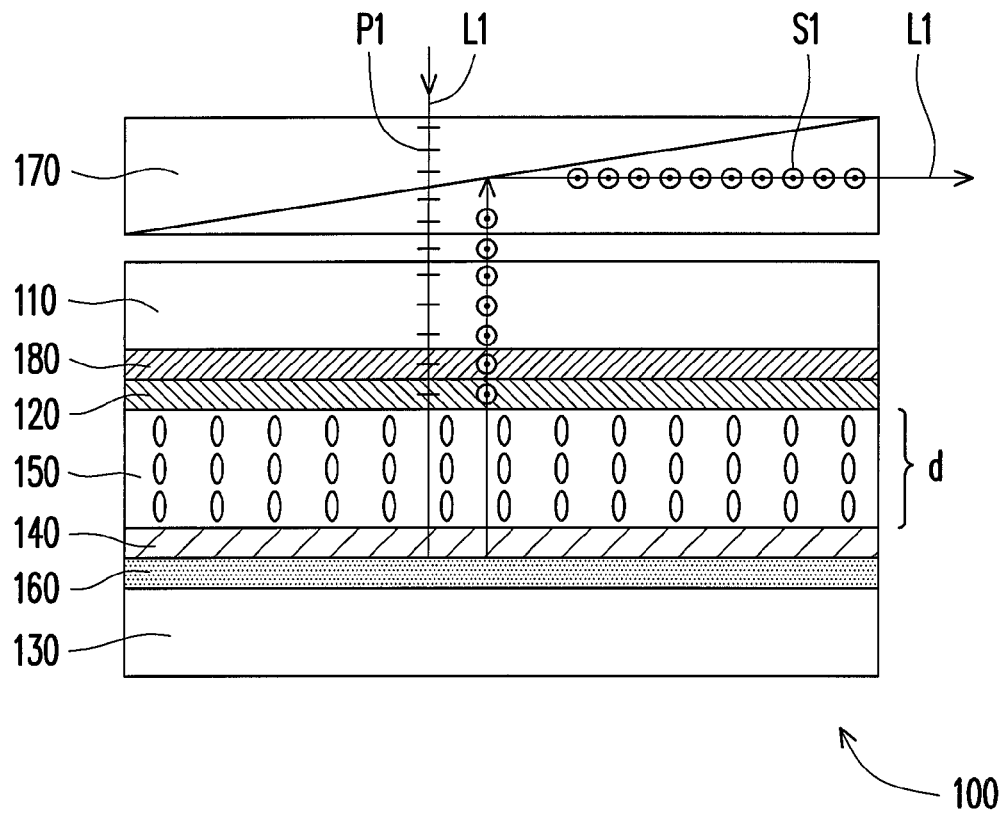
FIG. 1A is a schematic side view of a reflective liquid crystal panel in accordance with an embodiment of the invention.
Figure 1B:
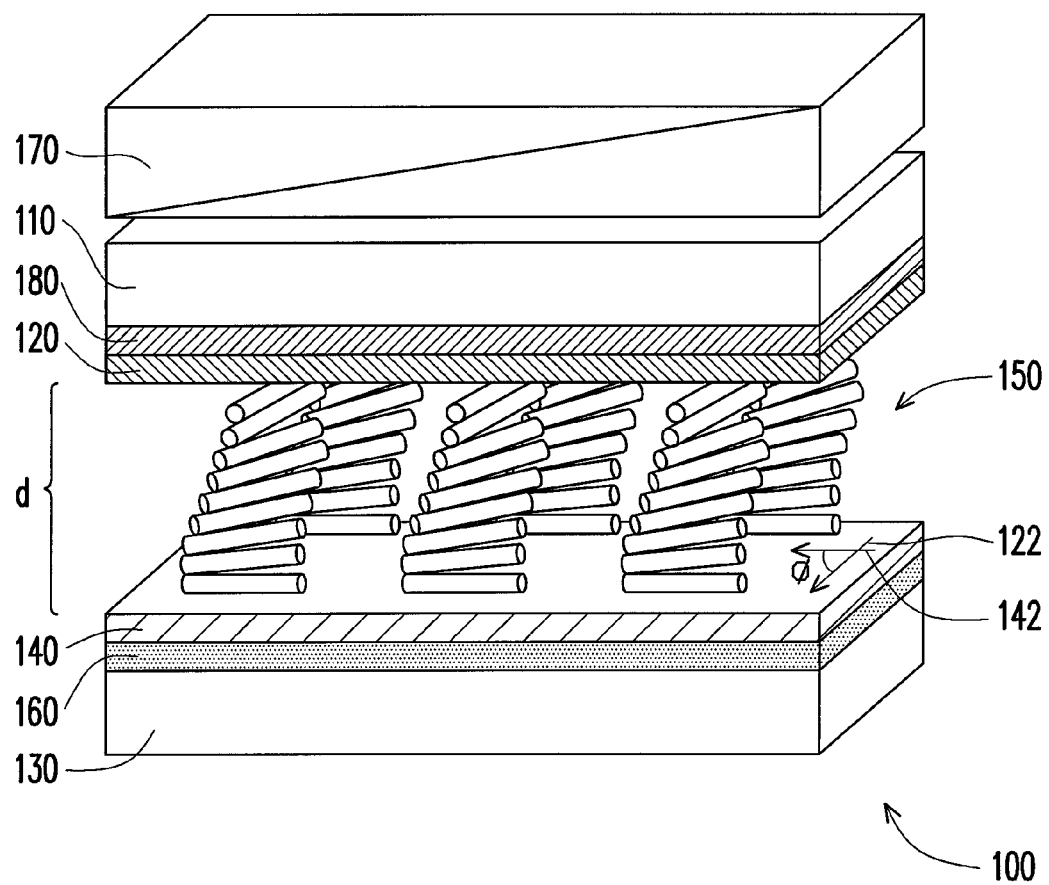
FIG. 1B is a perspective view of the reflective liquid crystal panel depicted in FIG. 1A.
Figure 2:
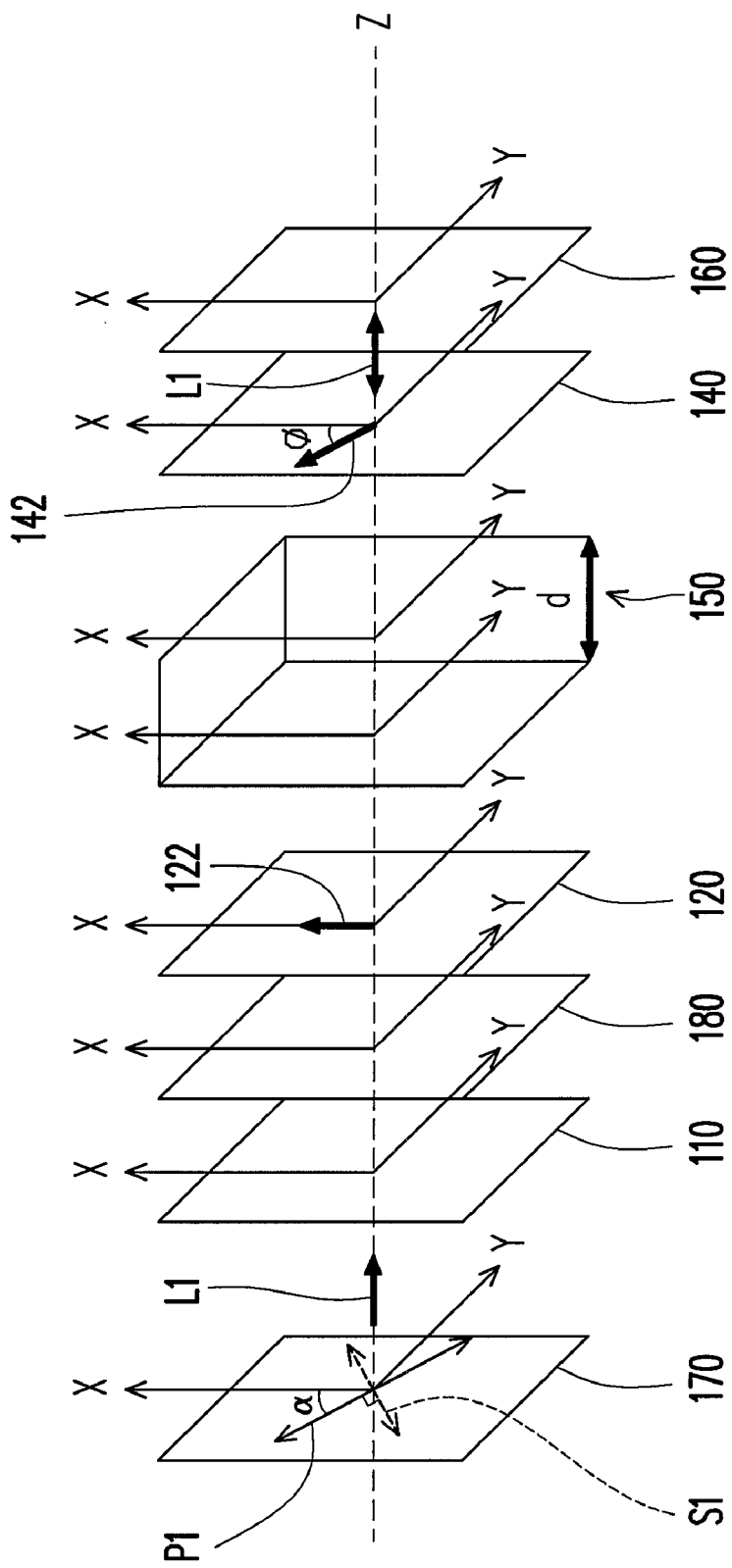
FIG. 2 is a schematic view of a light path transmitted in the reflective liquid crystal panel depicted in FIG. 1B.

FIG. 1A is a schematic side view of a reflective liquid crystal panel in accordance with an embodiment of the invention. FIG. 1B is a perspective view of the reflective liquid crystal panel depicted in FIG. 1A. FIG. 2 is a schematic view of a light path transmitted in the reflective liquid crystal panel depicted in FIG. 1B. Referring to FIGS. 1A, 1B and 2, a reflective liquid crystal panel 100 of the present embodiment includes a first substrate 110, a first alignment layer 120, a second substrate 130, a second alignment layer 140, a liquid crystal layer 150, and a reflection layer 160.

The first alignment layer 120 is disposed on the first substrate 110 and has a first alignment direction 122. The second substrate 130 is opposite to the first substrate 110. The second alignment layer 140 is disposed on the second substrate 130 and has a second alignment direction 142. An included angle φ between the first alignment direction 122 and the second alignment direction 142 is substantially between 68 degrees and 85 degrees, as shown in FIGS. 1B and 2. Moreover, the liquid crystal layer 150 is disposed between the first substrate 110 and the second substrate 130. The first alignment layer 120 and the second alignment layer 140 align the liquid crystal layer 150 so that the liquid crystal layer 150 has a twisted angle φ, and the twisted angle φ and the included angle φ are substantially the same.

More specifically, a required twisted angle φ of the liquid crystal layer 150 may be manipulated according to the alignment directions adopted by the first alignment layer 120 and the second alignment layer 140. Typically, the angle of the included angle φ between the first alignment direction 122 of the first alignment layer 120 and the second alignment direction 142 of the second alignment layer 140 defines the twisted angle φ of the liquid crystal layer 150. In other words, for the twisted angle φ to be substantially between 68 degrees and 85 degrees, the included angle φ between the first alignment direction 122 and the second alignment direction 142 can be made to be between 68 degrees and 85 degrees. Herein, the included angle φ may be defined as an included angle between an orthogonal projection of the first alignment direction 122 on the second alignment layer 140 and the second alignment direction 142, or an included angle φ between an orthogonal projection of the second alignment direction 142 on the first alignment layer 120 and the first alignment direction 122.

In the present embodiment, when the twisted angle φ of the liquid crystal layer 150 is 77 degrees, then the reflective liquid crystal display panel 100 according to the present embodiment may achieve a preferred optical performance or electrical characteristic, such as a high image contrast, a high reflectance, and a substantially faster response time as explained in the follow description. Clearly, when the twisted angle φ of the liquid crystal layer 150 is substantially between 68 degrees and 85 degrees, then the image contrast, reflectance, and response time of the reflective liquid crystal panel 100 may be enhanced. However, the aforementioned twisted angle φ of 77 degrees is merely used as an illustrative example, since the invention is not limited thereto.

It should be noted that, in FIG. 1B, a pre-tilt angle of the liquid crystal layer 150 is not drawn. In actuality, liquid crystal molecules typically produce pre-tilt angles where the first and second alignment layers 120 and 140 come into contact. Thus, FIG. 1B serves only as a simplified illustration, and the invention is not limited thereto. Moreover, the liquid crystal layer 150 depicted in FIG. 1B uses nematic liquid crystals as an example. However, in other embodiments of the invention, the liquid crystal layer 150 may adopt other suitable liquid crystal molecules, whereby a suitable alignment the twisted angle φ of the liquid crystal layer 150 may be made to be between 68 degrees and 85 degrees.

Additionally, as shown in FIGS. 1A, 1B and 2, the reflection layer is disposed between the second alignment layer 140 and the second substrate 130. In the present embodiment, a material of the reflection layer 160 comprises, for example, an aluminum metal having a high reflectance. In other embodiments of the invention, the material of the reflection layer 160 may comprise other highly reflective metallic materials or non-metallic materials. In the reflective liquid crystal panel 100, when a light L1 enters the reflective liquid crystal panel 100, the light L1 is reflected by the reflection layer 160. After being reflected by the reflection layer 160, the light L1 emitted from the first substrate 110 carries an image data, whereby an imaging state of the reflective liquid crystal panel can be formed. An operating manner of the reflective liquid crystal panel 100 according to the present embodiment is provided below for elaboration.

In the present embodiment, the reflective liquid crystal panel 100 further includes a beam splitter device 170 disposed on a side of the first substrate 110 away from the first alignment layer 120. The beam splitter device of the present embodiment is, for example, a polarization beam splitter, although the invention is not limited thereto, since other equivalent devices may be adopted to achieve the same effect. More specifically, when the reflective liquid crystal panel 100 employs the polarization beam splitter as the beam splitter device 170, then the beam splitter device 170 is adapted to transmit the light L1 to the first substrate 110. Moreover, as shown in FIG. 1A, when the light L1 is transmitted to the first substrate 110, the light L1 has a first polarization direction P1, and the beam splitter device 170 is adapted to pass through the light L1 having the first polarization direction P1. It should be noted that, the light L1 according to the present embodiment having the first polarization direction P1 may be a S-polarized light or a P-polarized light. In FIG. 1A, P-polarized light is used as an illustrative example, although S-polarized light may also be employed, according to a user requirement or design.

Thereafter, the light L1 having the first polarization direction P1 enters the liquid crystal layer 150 after passing through the first alignment layer 120, as shown in FIGS. 1A and 2. In the present embodiment, an angle α is formed between the first polarization direction P1 and the first alignment direction 122. The image contrast, reflectance, and response time of the reflective liquid crystal panel 100 may be enhanced with a range of the angle α that is substantially between 2 degrees and 7 degrees. In a preferred embodiment of the invention, the angle α may be substantially five degrees, although the invention is not limited thereto. Next, after passing through the liquid crystal layer 150, the light L1 having the first polarization direction P1 is reflected by the reflection layer 160 and after passing through the second alignment layer 140, the liquid crystal layer 150, and the first alignment layer 120 in sequence, the light L1 is emitted from the first substrate 110 and transmitted to the beam splitter device 170. At this moment, after the light L1 is emitted from the first substrate 110, the light L1 has a second polarization direction S1, in which the second polarization direction S1 and the first polarization direction P1 are different. Moreover, the second polarization direction S1 is, for example, substantially perpendicular to the first polarization direction P1, meaning an included angle between the first polarization direction P1 and the second polarization direction S1 is substantially 90 degrees. Furthermore, the light L1 having the second polarization direction s1 may carry an image data.

In more specifics, as an illustrative example, the aforesaid polarization beam splitter device 170 passes through the light L1 having the first polarization direction P1. Therefore, when the light L1 having the second polarization direction S1 is transmitted to the beam splitter device 170, the light L1 is reflected by the beam splitter device 170 and transmitted to an image side, as shown in FIG. 1A. Moreover, the light L1 having the second polarization direction S1 is, for example, a S-polarized light. In conjunction with the use of a projection system (not drawn), the light L1 having the second polarization direction S1 can be projected to form a reflective projection display device.

More specifically, the polarization directions P1 and S1 of the light L1 is mainly influenced by the liquid crystal layer 150. For example, the liquid crystal layer 150 can obtain a phase retardation $\Delta_{nd}$ by suitably designing a thickness d and the refractive indices $n_e$ and $n_o$ of the liquid crystal molecules. Accordingly, by suitably adjusting the thickness d of the liquid crystal layer 150 and selecting the refractive indices $n_e$ and $n_o$ of the liquid crystal molecules, the liquid crystal layer 150 may achieve the effect of a ¼ wave plate or a ½ wave plate.

For example, when the liquid crystal layer 150 is designed to have the effect of the ¼ wave plate, then after passing through the liquid crystal layer 150, the light L1 having the first polarization direction P1 has circular polarization. When reflected by the reflection layer 160 and passed through the liquid crystal layer 150 again, the light L1 has the aforementioned second polarization direction S1. In the present embodiment of the invention, the phase retardation $\Delta_{nd}$ of the liquid crystal layer 150 is substantially between $1.25 \times 10^{-7}$ m and $3.25 \times 10^{-7}$ m. Combined with the aforementioned parameter settings (e.g., the value of angle α and the twisted angle between 68 degrees and 85 degrees), the image contrast, reflectance, and response time of the reflective liquid crystal panel 100 may be enhanced. In a preferred embodiment of the invention, the phase retardation $\Delta_{nd}$ may be substantially $2.05 \times 10^{-7}$ m, although the invention is not limited thereto.

In the present embodiment, the first substrate 110 is, for example, a transparent substrate. In order to prevent the incident light L1 from being reflected by a surface of the reflective liquid crystal panel 100, therefore the transparent substrate may be an anti-reflection glass substrate. Moreover, the reflective liquid crystal panel 100 further includes an electrode layer 180 disposed between the first substrate 110 and the first alignment layer 120, for applying an electric field to drive the liquid crystal layer 150 and thereby achieve a display effect. In the present embodiment, the second substrate 130 is, for example, a chip substrate having a plurality of driving devices such as transistors disposed thereon, for controlling a twisting degree of each pixel (not drawn) in the liquid crystal layer 150.

Figure 3:
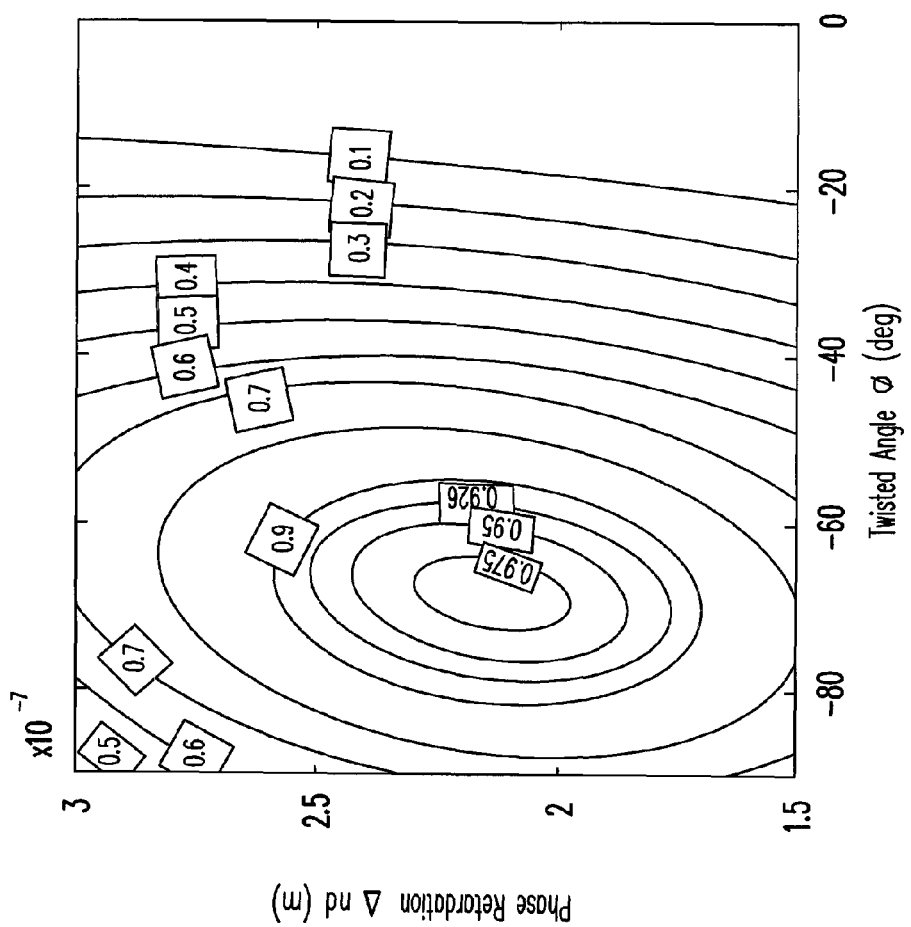
FIG. 3 is a schematic view of polarization conversion efficiencies of the reflective liquid crystal panel depicted in FIG. 1A corresponding to different twisted angles φ and phase retardations $\Delta_{nd}$.
Figure 4:
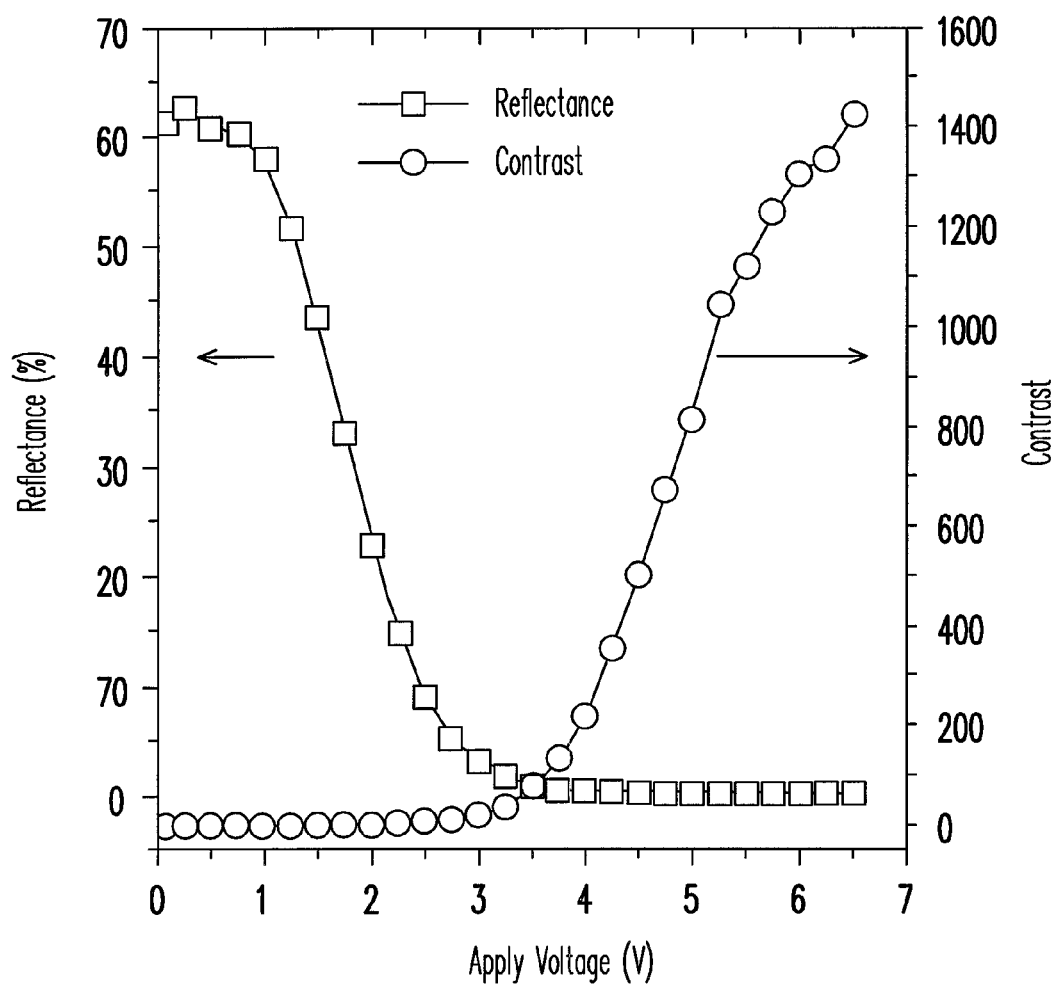
FIG. 4 is a schematic view of a reflectance and a contrast rendered by the reflective liquid crystal panel depicted in FIG. 1A.

Furthermore, based on the afore-described structure, FIG. 3 is a schematic view of a polarization conversion efficiencies of the reflective liquid crystal panel depicted in FIG. 1A corresponding to different twisted angles φ and phase retardations $\Delta_{nd}$. Additionally, FIG. 4 is a schematic view of a reflectance and a contrast rendered by the reflective liquid crystal panel depicted in FIG. 1A. As shown in FIGS. 3 and 4, when the reflective liquid crystal panel 100 adopts the afore-described parameter settings, besides the enhancement of the image contrast, reflectance, and response time thereof, the polarization conversion efficiency is enhanced by at least 7.9%, the contrast is increased by at least 60%, and the response time may be reduced by 25%, all without the use of compensation films. In other words, according to the structural parameter settings disclosed above adopted for the reflective liquid crystal panel 100, an optical performance and an electrical characteristic of the reflective liquid crystal panel 100 may be effectively enhanced.

Figure 5:
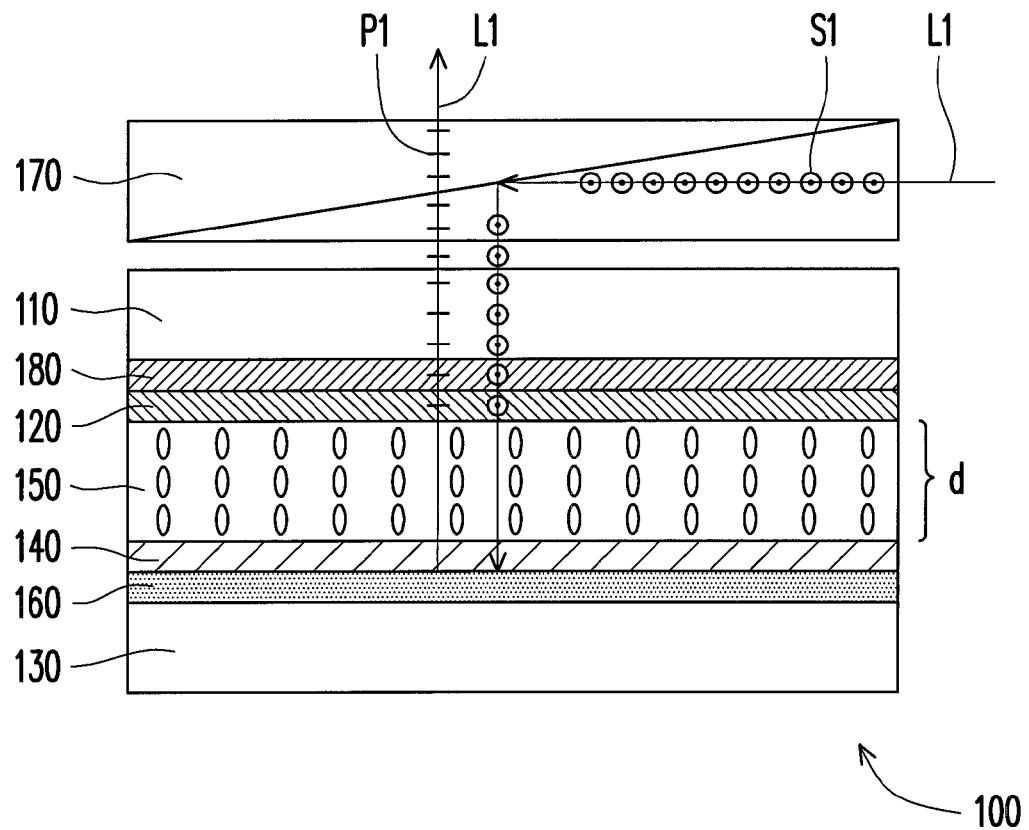
FIG. 5 is a schematic side view of a reflective liquid crystal panel in accordance with another embodiment of the invention.

According to an embodiment of the invention, by suitably adjusting the polarization direction of the incident light L1, a transmission direction of the emitted light from the reflective liquid crystal panel may be altered, as shown in FIG. 5. For example, in FIG. 1A, the light L1 first passes through the beam splitter device 170 before entering into the liquid crystal layer 150. Thereafter, the light L1 is reflected by the reflection layer 160 and passed through the liquid crystal layer 150 again, then the light L1 is reflected by the beam splitter device 170 and transmitted to an object side. However, in FIG. 5, the light L1 is first reflected by the beam splitter device 170 and transmitted into the liquid crystal layer 150, then reflected by the reflection layer 160 and passed through the liquid crystal layer 150 again, and thereafter the light L1 is passed through the beam splitter device 170 and transmitted to an object side. In an illustrative example, the above-described beam splitter device only allows passage of light having the first polarization direction P1 while reflecting light having the second polarization direction S1. In another embodiment of the invention, the converse may be implemented, and adjustments herein may be made according to a user's requirement, in which the initial polarization direction of the light L1 corresponds to the adjustments.

It should be noted that, as explained hereafter, when a range of the twisted angle φ is beyond 68 degrees and 85 degrees, then an overall performance of the reflective liquid crystal panel 100 becomes slightly inferior to designing the twisted angle φ to be substantially between a range of 68 degrees and 85 degrees.

Table 1 below represents the overall optical performance or the electrical characteristic of the reflective liquid crystal panel 100 when the twisted angle φ is respectively set at 90 degrees and 77 degrees. As shown in Table 1, when the twisted angle φ is set at 77 degrees, a polarization conversion efficiency (PCE), a static contrast, and a response time of the reflective liquid crystal panel 100 are effectively enhanced when compared to the twisted angle φ being set at 90 degrees.

TABLE 1

|  | φ = 90° | φ = 77° |
| --- | --- | --- |
| PCE | 88% | 95% |
| Static Contrast | 800 | 800 |
| Response Time | 1.6 ms | 1.12 ms |

In view of the foregoing description, embodiments of the invention are capable of achieving at least one of the following effects. Since the twisted angle of the liquid crystal layer is substantially between 68 degrees and 85 degrees, therefore the image contrast, reflectance, and response time of the reflective liquid crystal panel are enhanced. Moreover, the reflective liquid crystal panel may be configured to employ a beam splitter device such that light passing through the first alignment layer has the first polarization direction, and an angle α is formed between the first polarization direction and the first alignment direction, in which the range of the angle α is substantially between 2 degrees and 7 degrees. Accordingly, the image contrast, reflectance, and response time of the reflective liquid crystal panel may be further enhanced.

Furthermore, by suitably designing the thickness of the liquid crystal layer and the refractive indices of the liquid crystal molecules, such that the phase retardation of the liquid crystal layer is between $1.25 \times 10^{-7}$ m and $3.25 \times 10^{-7}$ m, and in conjunction with the aforementioned parameter settings (e.g., the values of the angle α and the twisted angle φ), besides being capable of enhancing the image contrast, reflectance, and response time of the reflective liquid crystal panel, the overall polarization conversion efficiency thereof is increased by at least 7.9%, thereby obtaining a preferred optical performance and electrical characteristic.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the headings are merely used to aid in searches of patent files and are not intended to limit the scope of the claims of the invention.

What is claimed is:

1. A reflective liquid crystal panel, comprising:
a first substrate;
a first alignment layer disposed on the first substrate and having a first alignment direction;
a second substrate opposite to the first substrate;
a second alignment layer disposed on the second substrate and having a second alignment direction, wherein an included angle between the first alignment direction and the second alignment direction is substantially between 68 degrees and 85 degrees;
a liquid crystal layer disposed between the first substrate and the second substrate, and the first alignment layer and the second alignment layer align the liquid crystal layer so that the liquid crystal layer has a twisted angle, wherein the twisted angle and the included angle are substantially the same, and a distance between the first alignment layer and the second alignment layer is configured for the liquid crystal layer to have a phase retardation, and the phase retardation of the liquid crystal layer is substantially between $2.05 \times 10^{-7}$ m and $3.25 \times 10^{-7}$ m; and
a reflection layer disposed between the second alignment layer and the second substrate.

2. The reflective liquid crystal panel as claimed in claim 1, wherein the twisted angle is substantially 77 degrees.

3. The reflective liquid crystal panel as claimed in claim 1, further comprising a beam splitter disposed on a side of the first substrate away from the first alignment layer, wherein the beam splitter is adapted to transmit a light to the first substrate, the light entering the liquid crystal layer by passing through the first alignment layer, and the light is reflected by the reflection layer, such that after the light passes through the second alignment layer, the liquid crystal layer, and the first alignment layer in sequence, the light is emitted from the first substrate.

4. The reflective liquid crystal panel as claimed in claim 3, wherein the light has a first polarization direction when transmitted to the first substrate, and an angle is formed between the first polarization direction and the first alignment direction, the angle being substantially between 2 degrees and 7 degrees.

5. The reflective liquid crystal panel as claimed in claim 4, wherein the angle is substantially 5 degrees.

6. The reflective liquid crystal panel as claimed in claim 4, wherein the light has a second polarization direction after being emitted from the first substrate, and the second polarization direction and the first polarization direction are different.

7. The reflective liquid crystal panel as claimed in claim 3, wherein the beam splitter comprises a polarization beam splitter.

8. The reflective liquid crystal panel as claimed in claim 1, wherein a light is adapted to enter into the reflective liquid crystal panel through the first substrate, and after the light passes through the first alignment layer, the liquid crystal layer, and the second alignment layer in sequence, the light is reflected by the reflection layer so that the light is emitted from the first substrate after passing through the second alignment layer, the liquid crystal layer, and the first alignment layer in sequence again.

9. The reflective liquid crystal panel as claimed in claim 8, wherein the light has a first polarization direction when entering the reflective liquid crystal panel, and an angle is formed between the first polarization direction and the first alignment direction, the angle being substantially between 2 degrees and 7 degrees.

* * * * *